(12) United States Patent
Lopez

(10) Patent No.: US 7,255,129 B2
(45) Date of Patent: Aug. 14, 2007

(54) VALVE WITH ELBOW JOINT DIVERTER

(75) Inventor: Thomas P. Lopez, Glendale, CA (US)

(73) Assignee: Pentair Water Pool and Spa, Inc., Moorpark, CA (US)

( * ) Notice: Subject to any disclaimer, the term of this patent is extended or adjusted under 35 U.S.C. 154(b) by 22 days.

(21) Appl. No.: 11/047,864

(22) Filed: Feb. 1, 2005

(65) Prior Publication Data

US 2006/0169337 A1    Aug. 3, 2006

(51) Int. Cl.
*F16K 11/08*    (2006.01)

(52) U.S. Cl. .................. 137/625.46; 137/874; 137/876

(58) Field of Classification Search ........... 137/625.46, 137/625.47, 874, 876; 251/118
See application file for complete search history.

(56) References Cited

U.S. PATENT DOCUMENTS

| | | | |
|---|---|---|---|
| 1,059,485 A | | 4/1913 | Orlopp |
| 1,166,571 A | * | 1/1916 | Bard .................... 137/625.45 |
| 1,484,126 A | | 2/1924 | Gaspard |
| 1,492,344 A | | 4/1924 | Astrom |
| 1,493,133 A | | 5/1924 | Sykora |
| 1,725,337 A | * | 8/1929 | Burkhard ................... 137/240 |
| 1,807,085 A | | 5/1931 | Crickmer |
| 2,094,714 A | | 10/1937 | Mueller |
| 2,233,192 A | | 2/1941 | Armington |
| 2,473,045 A | | 6/1949 | Adams, Jr. |
| 2,800,365 A | | 7/1957 | Hodges |
| 2,856,952 A | * | 10/1958 | Stillwagon ............... 137/454.6 |
| 2,907,349 A | | 10/1959 | White |
| 3,194,267 A | | 7/1965 | Lyon et al. |
| 3,365,165 A | | 1/1968 | Gire |
| 3,381,699 A | | 5/1968 | Coffman |
| 3,535,874 A | | 10/1970 | Smith |
| 3,545,470 A | * | 12/1970 | Paton ........................ 137/111 |
| 3,721,268 A | | 3/1973 | Erlich et al. |
| 3,860,035 A | | 1/1975 | Semple |
| 3,973,592 A | | 8/1976 | Cleaver et al. |
| 4,073,471 A | | 2/1978 | Lehtinen |
| 4,402,485 A | | 9/1983 | Fagerlund |
| 4,653,536 A | * | 3/1987 | Buhrman ............... 137/625.43 |
| 4,905,647 A | | 3/1990 | Kizer et al. |
| 4,972,877 A | | 11/1990 | Halemba et al. |
| 5,056,549 A | | 10/1991 | Bouilloux et al. |
| 5,105,853 A | * | 4/1992 | Lie ........................ 137/625.46 |
| 5,190,077 A | | 3/1993 | Pawelzik et al. |
| 5,482,249 A | | 1/1996 | Schafbuch et al. |
| 5,617,815 A | | 4/1997 | Spies et al. |
| 5,893,392 A | * | 4/1999 | Spies et al. ............ 137/625.47 |
| 5,937,903 A | | 8/1999 | Afshar et al. |
| 5,988,220 A | | 11/1999 | Sakaki |

(Continued)

*Primary Examiner*—John Fox
(74) *Attorney, Agent, or Firm*—Greenberg Traurig, LLP

(57) ABSTRACT

A multiport diverter valve comprising a valve housing defining a valving chamber therein. A plurality of ports open into the chamber. A flow diverter is pivotally mounted in the chamber and has a concave diverter surface forming a portion of a torus. First and second ends of the torus communicate with a first adjacent pair of the ports to provide a flow path between the adjacent pair. A valve handle is adapted to pivot the diverter to a position connecting a second adjacent pair of the ports with the second pair of ports including one of the ports from the first pair. The handle is further adapted to pivot the diverter to a position connecting all of the ports.

4 Claims, 2 Drawing Sheets

U.S. PATENT DOCUMENTS

| | | |
|---|---|---|
| 6,062,539 A | 5/2000 | Kawabe et al. |
| 6,216,736 B1 | 4/2001 | Benedetti |
| 6,361,051 B1 | 3/2002 | Babin |
| 6,401,754 B1 | 6/2002 | Winquist et al. |
| 6,439,540 B1 | 8/2002 | Tse |
| 6,497,250 B1 | 12/2002 | Johann |
| 6,595,229 B2 | 7/2003 | Tischler et al. |

* cited by examiner

VALVE WITH ELBOW JOINT DIVERTER

FIELD OF THE INVENTION

This invention relates to valves and, more particularly to multiport diverter valves used to change the flow of water in pool/spa system. A diverter also allows the use of the spa and then may be switched to the pool. Typically it is a three port valve that closes off one port and allows water to be diverted in from another port through an alternate port.

BACKGROUND OF THE INVENTION

Conventional diverter valves present a number of hydraulic engineering issues. Fluid flowing into the valve chamber experiences a pressure drop due to the relatively large cross sectional area of the chamber compared to the inlet port. Also friction losses and turbulent flow is caused by the flow striking the flow diverter and being forced to turn 90° to the outlet port.

Further, prior art diverter valves include flow diverters that close off a non-selected outlet port and permit flow to an open, selected port. The diversion occurs by default rather than a directional diversion by a flow diverter. U.S. Pat. No. 6,497,250 is an example of such an arrangement.

SUMMARY OF THE INVENTION

This invention provides a multiport diverter valve having a valving chamber therein. A plurality of ports open into the chamber and a flow diverter is pivotally mounted in the chamber. The flow diverter has a concave diverter surface forming a portion of a torus which could be a tubular portion. First and second ends of the torus with a first adjacent pair of the ports. This provides a smooth flow path between those ports to minimize pressure drop and turbulent flow. A handle connected to the flow diverter is adapted to pivot the diverter to a position connecting a second adjacent pair of ports. The second pair of ports includes one of the ports from the first pair. The flow diverter is adapted to pivot to a further position connecting all of the ports.

DETAILED DESCRIPTION OF THE INVENTION

Figure 1:
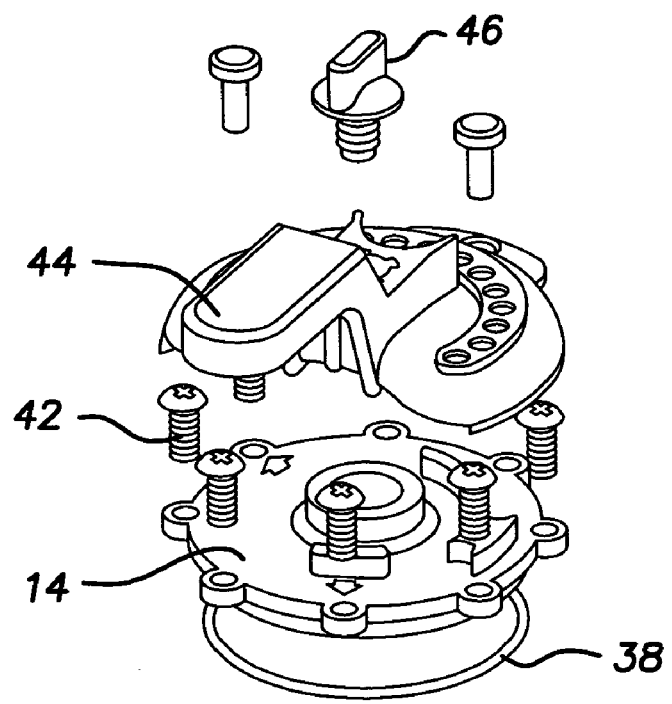
FIG. 1 is an exploded view of a multiport diverter valve according to this invention.
Figure 1:
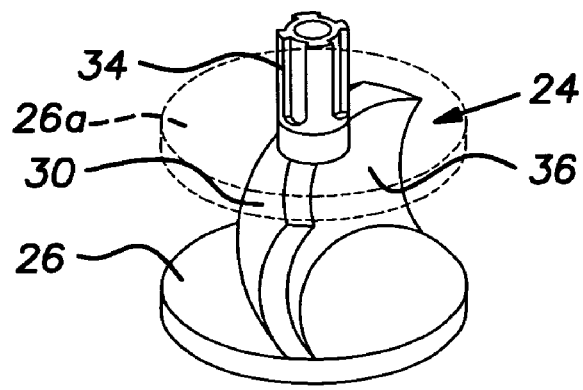
Figure 1:
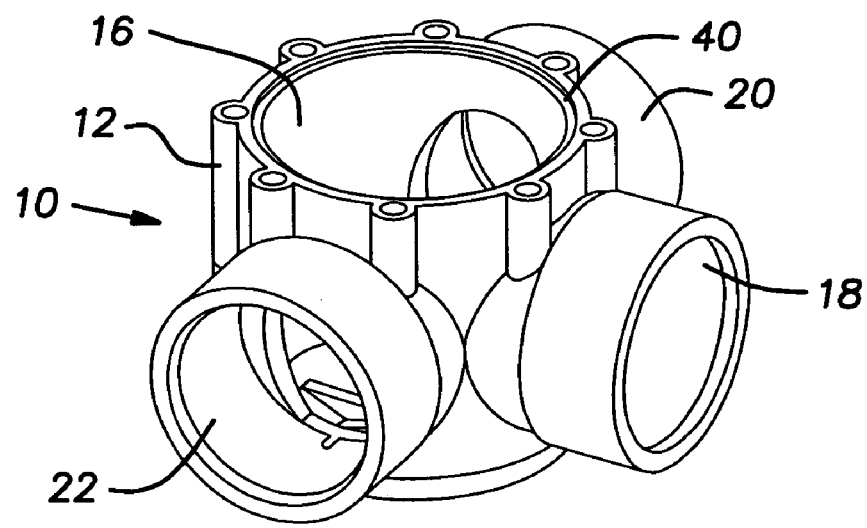

Referring now to the drawings and, particularly, to FIG. 1, there is illustrated a multiport diverter valve 10. The valve 10 includes a valve housing 12 which, with a cover 14, defines a valve chamber 16. A plurality of ports 18, 20, and 22 open into the chamber 16. A flow diverter 24 is pivotally mounted in the chamber 16. The flow diverter 24 includes a base plate 26 and a top plate 26(a) with an axially depending stub shaft (not shown) which is pivotally received in a socket (not shown) in the bottom of the chamber 16.

The flow diverter 24 also includes an elbow member 30 having a concave diverter surface 36 forming a portion of a torus. A mounting shaft 34 axially projects from the elbow member 30 and extends through the cover 14. An O-ring seal 38 is seated in a groove 40 in the upper rim of the valve housing 12 to seal the chamber 16. A plurality of screws 42 attach the cover 14 to the valve housing 12. A handle 44 is fixed to the shaft 34 by a screw 46. The mounting shaft may be driven automatically by a motor or the like.

Figure 2:
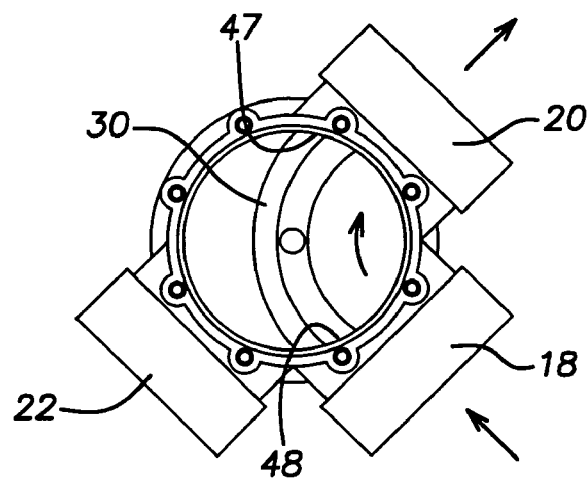
FIG. 2 is a plan view of the valve with the cover and handle removed for clarity and showing the flow diverter in a first position.

Movement of the handle 44 rotates the elbow member 30 to a number of operating positions connecting adjacent pairs of port or connecting all ports. In FIG. 2, the elbow member 30 has first and second ends 47 and 48 communicating with a first adjacent pair of ports 18 and 20. The concave surface 36 of the member 30 has a radius corresponding to the radii of the ports 18 and 20 to define a smooth flow path between those ports.

Figure 3:
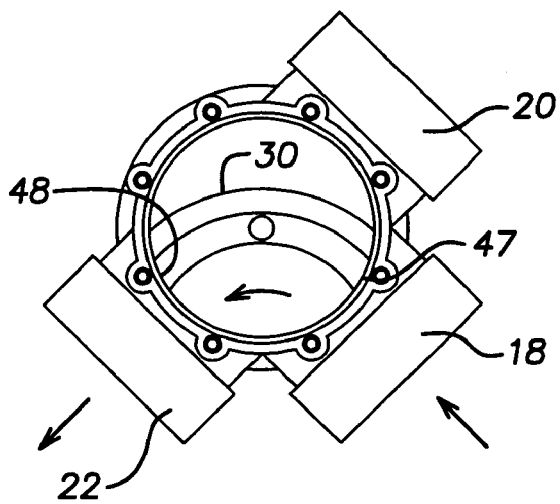
FIG. 3 is a plan view similar to FIG. 1, but showing the flow diverter in a second position.

In FIG. 3, the first and second ends 47 and 48 of the elbow member 30 communicate with a second adjacent pair of ports 18 and 22. The concave surface 36 of the member 30 has a radius corresponding to the radii of the ports 18 and 22 to define a smooth flow path between those ports.

Figure 4:
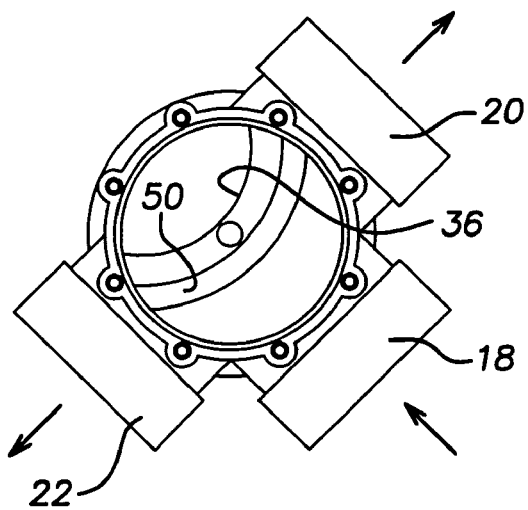
FIG. 4 is a plan view similar to FIGS. 2 and 3, but showing the flow diverter in a third position.

In FIG. 4 the elbow member is rotated to a position connecting all of the ports 18, 20 and 22. In this position the concave surface 36 does not communicate with any port and a convex surface 50 is presented to all of the ports and provides a smooth flow path from the port 18 to the ports 20 and 22.

Figure 5:
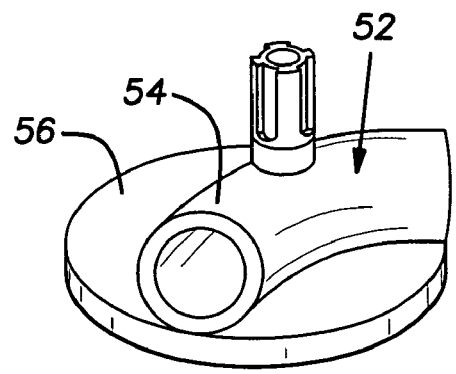
FIG. 5 is a perspective view of a flow diverter according to another aspect of the invention.

Referring now to FIG. 5, an elbow member 52 is in the form of a tubular portion 54 of a torus. The elbow member 52 has a base plate 56 and is adapted to be mounted in the valve casing 12 and is adapted to connect the port 18 with the port 20, or the port 22, or both.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A multiport diverter valve comprising a valve housing defining a valving chamber therein, a plurality of ports opening into said chamber, said flow diverter pivotally mounted in said chamber, said flow diverter having a concave diverter surface forming a portion of a torus, first and second ends of said torus communicating with a first adjacent pair of said ports to provide a flow path only between the adjacent pair while blocking flow to another port, means to pivot said diverter to a position connecting a second adjacent pair of said ports to provide a flow path only between said second adjacent pair while blocking flow to another port, said second pair including one of said ports from said first pair, said diverter being movable to a position simultaneously connecting all of said parts.

2. A multiport diverter valve according to claim 1 wherein said portion of said torus includes a tubular portion.

3. A multiport diverter according to claim 1 including a cover defining a portion of said chamber and an operating handle connected to said flow diverter.

4. A multiport diverter valve comprising a valve housing including a cover defining a chamber, a plurality of ports opening into said chamber, a flow diverter pivotally mounted in said chamber, said flow diverter being defined by concave and convex surfaces forming a portion of a torus, an operating handle connected to said flow diverter, first and second ends of said torus communicating with a first adjacent pair of said ports when said handle is in a first position to provide a flow path between the first adjacent pair, said first and second ends of said torus communicating with a second adjacent pair of said ports when said handle is in a second portion to provide a flow path between the second adjacent pair, said second pair including one of said ports from said first pair, said handle being moveable to a third position to pivot said diverter to a position wherein the concave surface of said diverter does not connect any of said ports and the convex side of said diverter connects all of said ports.

* * * * *